United States Patent
Ito et al.

(10) Patent No.: US 12,105,759 B2
(45) Date of Patent: Oct. 1, 2024

(54) RECOMMENDATION SYSTEM THAT SELECTS AN OPTIMAL ALGORITHM FOR MAKING AN APPROPRIATE CONTENT RECOMMENDATION TO A USER

(71) Applicant: NTT DOCOMO, INC., Chiyoda-ku (JP)

(72) Inventors: Taku Ito, Chiyoda-ku (JP); Kunihiro Aiba, Chiyoda-ku (JP); Yuri Sasaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 19 days.

(21) Appl. No.: 18/001,179

(22) PCT Filed: Apr. 19, 2021

(86) PCT No.: PCT/JP2021/015908
§ 371 (c)(1),
(2) Date: Dec. 8, 2022

(87) PCT Pub. No.: WO2021/251002
PCT Pub. Date: Dec. 16, 2021

(65) Prior Publication Data
US 2023/0229708 A1    Jul. 20, 2023

(30) Foreign Application Priority Data

Jun. 12, 2020   (JP) ................. 2020-102576

(51) Int. Cl.
*G06F 16/9035*    (2019.01)
*G06Q 30/0601*    (2023.01)

(52) U.S. Cl.
CPC ..... *G06F 16/9035* (2019.01); *G06Q 30/0631* (2013.01)

(58) Field of Classification Search
CPC ...... G06F 16/9035; G06F 16/00; G06F 13/00; G06F 16/9535; G06Q 30/0631; G06Q 30/02; G06Q 50/10
See application file for complete search history.

(56) References Cited

U.S. PATENT DOCUMENTS

| 7,581,237 B1 * | 8/2009 | Kurapati | H04N 21/4826 |
| | | | 707/999.005 |
| 2003/0105682 A1 * | 6/2003 | Dicker | G06Q 30/0253 |
| | | | 705/26.8 |

(Continued)

FOREIGN PATENT DOCUMENTS

JP    2018-163460 A    10/2018

OTHER PUBLICATIONS

Sarwar et al., Analysis of Recommendation Algorithms for E-Commerce, EC'00, Oct. 17-20, 2000, Minneapolis, Minnesota, pp. 158-167. (Year: 2000).*

(Continued)

*Primary Examiner* — Cheyne D Ly
(74) *Attorney, Agent, or Firm* — Oblon, McClelland, Maier & Neustadt, L.L.P.

(57) ABSTRACT

A recommendation system includes: a first acquisition unit configured to acquire user history information; a calculation unit configured to calculate a use maturity representing maturity of use of a service for each of a plurality of users on the basis of the user history information; a second acquisition unit configured to acquire recommendation history information including target algorithm information and recommendation success/non-success information; a selection unit configured to select a target algorithm on the basis of the recommendation history information of a user group having a use maturity corresponding to the use maturity of the target user among the plurality of users; and a recommendation unit configured to determine a content to be (Continued)

recommended to the target user using the selected target algorithm and output information representing the determined content.

10 Claims, 8 Drawing Sheets

(56) References Cited

U.S. PATENT DOCUMENTS

| | | | | |
|---|---|---|---|---|
| 2007/0118546 A1* | 5/2007 | Acharya | ............. | G06F 16/9535 |
| 2008/0133344 A1* | 6/2008 | Hyder | .................... | G06Q 30/02 |
| | | | | 705/14.73 |
| 2010/0251305 A1* | 9/2010 | Kimble | .............. | H04N 7/17318 |
| | | | | 725/46 |
| 2012/0143718 A1* | 6/2012 | Graham | ............. | G06Q 30/0631 |
| | | | | 705/26.7 |
| 2017/0004402 A1* | 1/2017 | Graham | .............. | G06F 16/9535 |

OTHER PUBLICATIONS

Collins, et al., One-at-a-time: A Meta-Learning Recommender-System for Recommendation-Algorithm Selection on Micro Level, eprint arXiv: 1805.12118, pp. 1-10 (Year: 2018).*

International Search Report mailed on Jul. 20, 2021 in PCT/JP2021/015908 filed on Apr. 19, 2021.

International Preliminary Report on Patentability and Written Opinion issued Dec. 22, 2022 in PCT/JP2021/015908 (with English Translation of Written Opinion), 8 pages.

* cited by examiner

Fig.2

| CLICK DATE AND TIME | USER NAME | CONTENT NAME | GENRE NAME |
|---|---|---|---|
| 4/21 13:00 | USER X | ppp | ANIMATION |
| 4/21 13:30 | USER X | qqq | ANIMATION |
| 4/23 11:00 | USER X | rrr | MOVIE |

Fig.3

| IMPRESSION DATE AND TIME | TARGET ALGORITHM | USER NAME | USE MATURITY | RECOMMENDATION SUCCESS/ NON-SUCCESS |
|---|---|---|---|---|
| 4/21 13:00 | ALGORITHM A | USER X | 0.45 | SUCCESS |
| 4/21 13:30 | ALGORITHM B | USER X | 0.49 | SUCCESS |
| 4/21 13:30 | ALGORITHM A | USER X | 0.49 | NON-SUCCESS |
| 4/23 11:00 | ALGORITHM B | USER Y | 0.55 | NON-SUCCESS |
| 4/23 12:00 | ALGORITHM A | USER Z | 0.43 | SUCCESS |

| item | ORDER OF POPULARITY | GENRE | |
|---|---|---|---|
| aa | 1ST | MYSTERY | |
| bb | 5TH | ACTION | } C |
| cc | 8TH | ROMANCE | |

(b)

| item | ORDER OF POPULARITY | GENRE | |
|---|---|---|---|
| dd | 13TH | MYSTERY | |
| ee | 6TH | MYSTERY | } A |
| ff | 18TH | MYSTERY | |

| item | ORDER OF POPULARITY | GENRE |
|------|---------------------|---------|
| gg | 17TH | MYSTERY |
| jj | 4TH | ROMANCE |
| kk | 3RD | ACTION |

} A
} C (b)

| item | ORDER OF POPULARITY | GENRE |
|------|---------------------|---------|
| gg | 17TH | MYSTERY |
| hh | 22ND | MYSTERY |
| ii | 19TH | MYSTERY |

} A

RECOMMENDATION SYSTEM THAT SELECTS AN OPTIMAL ALGORITHM FOR MAKING AN APPROPRIATE CONTENT RECOMMENDATION TO A USER

TECHNICAL FIELD

The present invention relates to a recommendation system.

BACKGROUND ART

In a service for providing content for a user, a technology for inferring content that is likely to be selected by a user and recommending use of the inferred content to the user is known. In Patent Literature 1, an information processing device that determines recommended content to be recommended to a user on the basis of a profile of the content viewing user and presents the recommended content to a content output device viewed by the user has been described.

CITATION LIST

Patent Literature

[Patent Literature 1] Japanese Unexamined Patent Publication No. 2018-163460

SUMMARY OF INVENTION

Technical Problem

Meanwhile, in a recommendation system, there are cases in which a recommendation is made using an algorithm configured to determine a content to be recommended to a target user. In such cases, for example, in a case in which a single algorithm is used, there is concern that changes in requirements for a user's recommendation may not be able to be handled, and a user may become tired of recommended content. Thus, it is conceivable to select one algorithm among a plurality of algorithms each time a recommendation is made, but it is assumed to be difficult for a recommendation system to ascertain an algorithm that is optimal for a user and select that algorithm. Thus, in the recommendation system as described above, there is concern that content may not be appropriately recommended for a user.

One aspect of the present invention is in consideration of the situations described above and relates to a recommendation system capable of appropriately recommending content to a user.

Solution to Problem

In order to achieve the object described above, according to one aspect of the present invention, there is provided a recommendation system that is configured to determine a content to be recommended to a target user in a service providing contents to a plurality of users including the target user using a target algorithm that is one algorithm selected among a plurality of algorithms each configured to determine a content to be recommended to the target user and having mutually-different features as trends in determination of contents, the recommendation system including: a first acquisition unit configured to acquire first history information that is information representing histories relating to use of contents of the plurality of users; a calculation unit configured to calculate a use maturity representing a maturity of use of the service for each of the plurality of users on the basis of the first history information; a second acquisition unit configured to acquire second history information including target algorithm information representing the target algorithm used when contents are recommended to each of the plurality of users and recommendation success/non-success information that is information representing whether or not the contents recommended using the target algorithm has been used by each of the plurality of users; a selection unit configured to select the target algorithm on the basis of the second history information of a user group having a use maturity corresponding to the use maturity of the target user among the plurality of users; and a recommendation unit configured to determine a content to be recommended to the target user using the selected target algorithm and output information representing the determined content to be recommended.

In the recommendation system according to one aspect of the present invention, by selecting a target algorithm on the basis of the second history information of a user group having a use maturity corresponding to the use maturity of the target user and using the selected target algorithm, a content to be recommended to the target user is determined, and information representing the determined content is output. Therefore, according to the recommendation system according to one aspect of the present invention, an appropriate target algorithm is selected in accordance with the use maturity of the target user, and as a result, a content can be appropriately recommended to the user.

Advantageous Effects of Invention

According to one aspect of the present invention, a content can be appropriately recommended to a user.

BRIEF DESCRIPTION OF DRAWINGS

FIG. 2 is a diagram illustrating an example of server information acquired by a first acquisition unit.

FIG. 3 is a diagram illustrating an example of recommendation history information acquired by a second acquisition unit.

FIG. 5 is a diagram illustrating an example of a recommendation result displayed in a terminal held by a target user.

FIG. 6 is a diagram illustrating an example of a recommendation result displayed in a terminal held by a target user and a comparative example of recommendation results displayed in a terminal held by a target user.

DESCRIPTION OF EMBODIMENTS

Hereinafter, an embodiment of the present invention will be described in detail with reference to the attached drawings. In description of the drawings, the same reference signs will be used for the same or equivalent elements, and duplicate description will be omitted.

Figure 1:
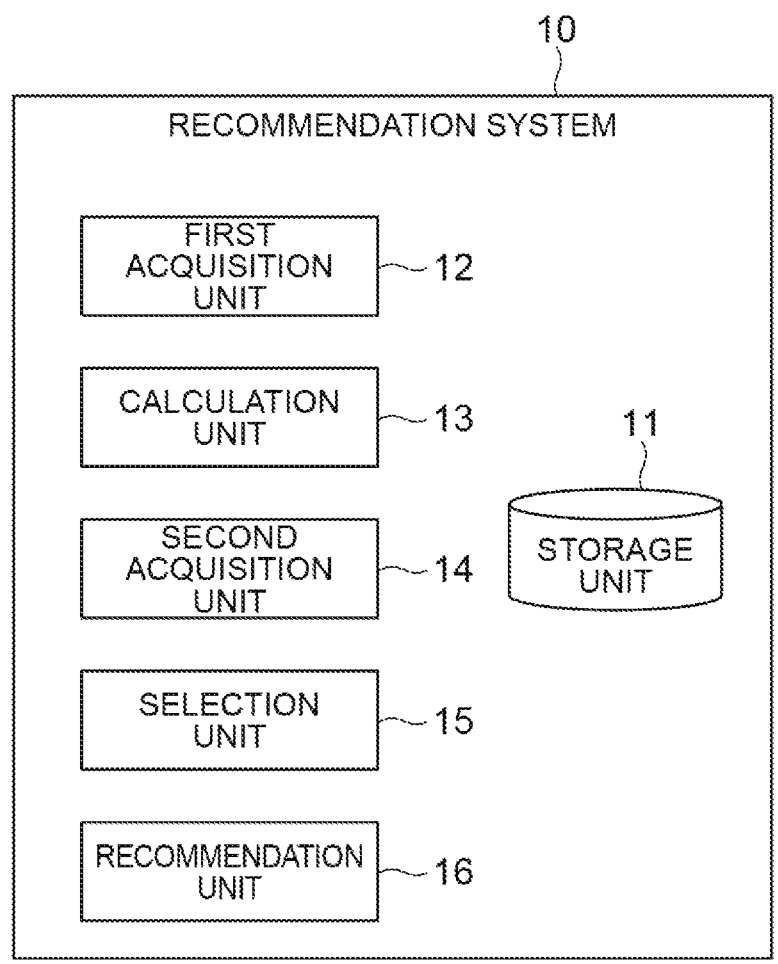
FIG. 1 is a functional block diagram of a recommendation system according to this embodiment.

FIG. 1 is a functional block diagram of a recommendation system 10 according to this embodiment. The recommendation system 10 is a system (device) that determines a content to recommend to a target user in a service for providing contents to a plurality of users including the target user. For example, the service is a content providing service operated by a communication service provider through a mobile communication network and provides various contents in accordance with requests from users. Each user is a user whose user attribute information is registered in an attribute information server (details will be described below) and is a user using a service. More specifically, for example, each user causes a terminal to display information representing a content on the WEB or through an application installed in the terminal held by the user as use of the service. For example, the service is provided by an external service system (not illustrated) different from the recommendation system 10. The recommendation system 10 is configured to be able to transmit/receive data to/from a service system through a communication network.

Examples of recommended contents include a moving image, a musical piece, an electronic book, an advertisement (a push advertisement), and the like. Recommended contents include contents of various genres and newly-created content. For example, in a case in which a service is a moving image providing service, examples of genres include mysteries, actions, romance, and the like. Newly-created contents, for example, are contents of a predetermined period after addition thereof to the service. In addition, recommended contents are not limited to those according to this embodiment and, for example, may be physical contents such as products handled in an online shopping service or the like. Furthermore, the recommendation system 10 may be the same system as a service system.

For example, at a timing at which one user logs into the service, the service system (an opposing system) transmits a request for a recommendation of a content for a target user with the user set as the target user to the recommendation system 10. Then, when the request for a recommendation for a content for the target user is received from the service system, the recommendation system 10 outputs information representing a content to recommend (hereinafter, referred to as "recommendation content information") to the service system. In other words, the target user is a user who receives a recommendation of a content among a plurality of users using the service and, in this embodiment, is a user designated by the service system. The target user is not limited to the example of this embodiment. For example, for example, the recommendation system 10 may output recommendation content information to the service system for each user who is a target user by setting each of all the users as target users.

A recommendation of a content to a target user is performed, for example, by transmitting recommendation content information from the recommendation system 10 to a terminal held by the target user through the service system. By performing output such as display of recommendation content information in the terminal, the target user can recognize a recommended content. In a case in which the target user is interested in the recommended content, the target user can use the recommended content by operating the terminal. More specifically, for example, in a case in which the service is a moving image providing service, the target user uses a content by clicking the recommended content (a moving image) in the terminal and viewing the content. In accordance with a type of recommended content, a user's use form may differ.

In the recommendation system 10, one algorithm (a target algorithm) is selected among a plurality of algorithms each configured to determine a content recommended to a target user. Then, a recommended content is determined using the selected target algorithm. In this embodiment, algorithm A, algorithm B, and algorithm C are stored in advance as a plurality of algorithms in the recommendation system 10. Each of the plurality of algorithms A, B, and C is configured to determine a content to be recommended to a target user and is configured to determine a plurality of contents to be recommended to the target user in one recommendation. Algorithms A, B, and C have mutually-different features as trends of determination of contents. More specifically, algorithm A recommends contents in accordance with a use history of contents of a target user. Algorithm B recommends newly-created contents. Algorithm C recommends contents of various genres. Details of algorithms A, B, and C will be described below. In addition, each of algorithms A, B, and C may be configured to recommend one content to a target user in one recommendation.

The recommendation system 10 selects a target algorithm by executing calculation based on a bandit algorithm. The bandit algorithm is a technique for selecting an option by controlling a ratio between utilization (selection of an option for maximizing a profit from information that is current known) and a search (selection of an option for acquiring information other than the information that is currently known). The recommendation system 10 selects a target algorithm using Thompson sampling as such a bandit algorithm. For example, as a technique for selecting a target algorithm, there is a technique of calculating a beta distribution in which a probability variable is taken on a horizontal axis (an X axis), and a probability density is taken in a vertical axis (a Y axis) for each of algorithms A, B, and C. The probability variable described here corresponds to a score representing a degree of a target user's use of recommended content at the time of recommending content to the target user using the algorithm as a target algorithm. As an example of the score, there is a click through rate (CTR) at which a user clicks a recommended content. The probability density described here corresponds to a degree of relative likelihood in the occurrence of a corresponding score.

Hereinafter, a method of selecting a target algorithm using Thomson sampling will be described in detail. Generally, the beta distribution is represented by Equation (1) as below.

[Math. 1]

$$\theta^i \sim \text{Beta}(1+\alpha, 1+\beta) \quad (1)$$

α and β in Equation (1) represented above represent positive real numbers, and a value taken by a probability variable x is 0≤x≤1. The beta distribution is a distribution of which a probability density function is defined as $x^{\alpha-1}(1-x)^{\beta-1}/B(\alpha,\beta)$. Symbols that are used in common in the equations shown below represent the same elements, and description thereof will be omitted below.

Generally, in the Thomson sampling, a uniform distribution is assumed as a prior distribution. The reason for this is that there is no result (data) of recommendation in which a plurality of algorithms are used for a target user at the time of starting use of a service. Then, in a case in which recommendation of a content is made using a target algorithm for a target user, Equation (2) is defined as below as a posterior distribution in Thompson sampling.

[Math. 2]

$$\theta_t \sim \text{Beta}(1+l, 1+n-l) \quad (2)$$

In Equation (2) represented above, i represents information that can be used for uniquely identifying an algorithm, n represents the number of recommendations of contents to a target user using an algorithm i (that is, a sum value of the number of successful recommendations and the number of unsuccessful recommendations), and 1 represents the number of times of a target user's clicking of a content (that is, the number of successful recommendations).

As a technique for selecting a target algorithm, a technique of calculating a beta distribution using Equation (2) represented above for each of algorithms A, B, and C, generating a value of a probability variable (hereinafter, referred to as an "index value"), which is a random number, with a probability according to the calculated beta distribution of each of algorithms A, B, and C, and selecting an algorithm of which the index value is the largest as a target algorithm may be considered. Generation of the random number may be performed using a known method.

Here, the technique for selecting a target algorithm described above using a target user distribution T2 that is an example of the beta distribution illustrated in FIG. 4 will be described. The target user distribution T2 is a beta distribution of one target user and is a beta distribution calculated using Equation (2) represented above for each of algorithms A, B, and C. Details of the target user distribution T2 will be described below.

In the target user distribution T2, a probability variable X represents a score, and a probability density represents a degree of relative likelihood of the occurrence of a score. The score has a value of 0 to 1 and indicates that a degree of a user using recommended content (in other words, a likelihood of a user clicking the recommended content) becomes higher as the value becomes larger. By using such a target user distribution T2, and an index value of each of algorithms A, B, and C is generated with a probability according to the target user distribution T2. For example, in the probability distribution of algorithm A, as illustrated in FIG. 4, the probability variable X takes a value of about 0.5 to 0.9, and the probability variable X has a shape of a mountain having a vertex at about 0.7 of the probability variable X (in other words, the probability density becomes a maximum for the probability X of being 0.7). This represents that the index value has one value of about 0.5 to 0.9, and the probability of being about 0.7 is the highest. By generating an index value for each of algorithms A, B, and C in accordance with such a target user distribution T2, an algorithm of which a corresponding index value (a score serving as an index value) is the largest can be selected as a target algorithm.

Here, in a case in which this technique is used for a recommendation, there are the following problems. That is, in accordance with accumulation of results (data) of recommendations of contents using a target algorithm for a target user, the probability distribution has a dispersion gradually decreases and converges. In such a case, when recommendation history information is accumulated and a dispersion of the probability distribution converges up to some degrees in accordance with a target user's use of the service, even in a case in which the index value is generated, an index value of a specific algorithm becomes the highest at each time, and the selected algorithm is fixed. In that case, for example, even in a case in which a target user desires a recommendation of a content of a trend different from that of contents that have been recommended using a corresponding algorithm, the target user's desire cannot be handled, and there is concern that the user becomes tired of the recommendation.

Thus, the recommendation system 10 according to this embodiment selects a target algorithm such that an appropriate content is recommended to a user while preventing fixation of a selected target algorithm. For example, the recommendation system 10 is realized by a computer such as a server apparatus, a personal computer (PC), or the like. In addition, the recommendation system 10 may be realized by a plurality of computers, that is, a computer system.

Subsequently, the function of the recommendation system 10 according to this embodiment will be described. As illustrated in FIG. 1, the recommendation system 10 is configured to include a storage unit 11, a first acquisition unit 12, a calculation unit 13, a second acquisition unit 14, a selection unit 15, and a recommendation unit 16.

The storage unit 11 stores information that is necessary for recommending contents using the recommendation system 10. The storage unit 11 stores algorithms A, B, and C in advance. Each of the algorithms A, B, and C is stored in the storage unit 11 in advance, for example, by a designer or the like of the recommendation system 10. In addition, the storage unit 11 stores various kinds of information that is acquired from one or a plurality of servers (details thereof will be described below) installed outside the recommendation system 10 and is referred to by the recommendation system 10. Information that is calculated in a series of processes of a recommendation is input from each of the constituent elements to be described below to the storage unit 11. The information stored by the storage unit 11 is referred to by each of the constituent elements (the first acquisition unit 12, the calculation unit 13, the second acquisition unit 14, the selection unit 15, and the recommendation unit 16) as required.

Here, a configuration of each of the algorithms A, B, and C stored in the storage unit 11 will be described. Each of the algorithms A, B, and C acquires information from one or a plurality of external servers and performs a different process, thereby determining a content to be recommended to a user.

Examples of the servers include one or a plurality of attribute information servers (not illustrated) in which attribute information of each user using a service is stored, one or a plurality of log servers (not illustrated) in which log information of each user using a service is stored, and one or a plurality of content servers (not illustrated) in which information relating to each of pieces of content that can be recommended by the recommendation system 10 is stored.

In the attribute information server, for example, a user name, sex, age, and the like of each user are stored in association with each other as attribute information. In the log server, for example, click date and time information, impression date and time information, a user name, a content name, target algorithm information, recommendation success/non-success information, and the like of each user are stored in association with each other as log data. The impression date and time information is information that represents a time at which a content was recommended to a target user. The click date and time information represents a date and time at which a target user selected a content. The user name is information that can be used for uniquely identifying a corresponding user. The content name is information that can be used for uniquely identifying a content used by a corresponding user. The target algorithm information and the recommendation success/non-success information will be described below.

In the content server, for example, a content name, a genre name, flag information, a ranking information, and the like are stored in association with each other as information relating to each content. The content name is information that can be used for uniquely identifying a content. The genre name is information that can be used for uniquely identifying a genre of a corresponding content. The flag information is information that represents whether or not a corresponding content is a newly-created content, and, for example, 1 is input in a case in which a corresponding content is a newly-created content, and 0 is input in a case in which a corresponding content is not a newly-created content. The ranking information is information that represents a popularity rank of a corresponding content. For example, the ranking information includes an overall rank of a corresponding content in a service for a latest two weeks and a genre rank that is a rank of a corresponding content in a genre to which the corresponding content belongs.

For example, algorithm A is configured to determine contents to be recommended to a target user on the basis of attribute information of a target user and other users stored in the attribute information server and user names and used content names of the target user and each of the other users. As one example, in algorithm A, by using conventional collaborative filtering, another user whose attributes and used contents are similar to those of a target user is identified, and three pieces of content used by the identified other user are recommended to the target user.

For example, algorithm B is configured to determine contents to be recommended to a target user on the basis of a content name, flag information, and ranking information stored in the content server. As one example, in algorithm B, contents associated with a new-arrival flag: 1 are identified on the basis of the flag information. Then, in algorithm B, contents determined in accordance with ranking information among the identified contents are recommended to the target user. As one example, in algorithm B, a content of which an overall rank is the highest to a content of which an overall rank is a third highest may be recommended to the target user.

For example, algorithm C is configured to determine contents to be recommended to a target user on the basis of a content name, genre information, and ranking information stored in the content server. As one example, in algorithm C, genres and the number of the genres of contents to be recommended are set in advance. For example, in a case in which content is moving images, in algorithm C, one piece of content is recommended from each of three genres such as one from a mystery genre, one from an action genre, and one from a romance genre. As a content selected in each genre, for example, a content ranked first in the genre may be selected on the basis of the ranking information.

As above, contents are determined such that algorithms A, B, and C have mutually-different features as trends in determination of contents. In addition, in this embodiment, the configurations of algorithms A, B, and C are examples. For example, algorithms A, B, and C may be generated using another method such as machine learning using a neural network. In addition, the number of contents recommended by each of algorithms A, B, and C to a user may be one and is not particularly limited.

The description of the functional constituent elements of the recommendation system 10 illustrated in FIG. 1 will be continued. The first acquisition unit 12 acquires user history information (first history information) of a plurality of users. The user history information is information that represents histories relating use of contents of a plurality of users. First, the first acquisition unit 12, for example, acquires click date and time information, a user name, and a content name acquired from the log server and a content name and a genre name acquired from the content server in association with the common content name. The click date and time information, the user name, the content name, and the genre name (hereinafter, they may be simply referred to as "server information") that have been acquired are used for acquisition (calculation) of user history information to be described below. In addition, the first acquisition unit 12 may acquire server information from the storage unit 11 instead of the log server and the content server. A timing at which the first acquisition unit 12 acquires server information, for example, may be each time the log external server updates information and a predetermined timing.

FIG. 2 is a diagram illustrating an example of server information acquired by the first acquisition unit 12. The server information includes click date and time information, a user name, a content name, and a genre name. In FIG. 2, although data of a user name "user X" is illustrated, this is merely an example, and additional data of a user ID "user X" or data of other user names, and the like may be included. In addition, in the server information, information that is necessary for acquisition of user history information to be described below may be included, and information other than the information described in this embodiment may be included.

The first acquisition unit 12 calculates and acquires number of times of use information, use period information, content quantity information, and genre information as user history information on the basis of the server information. The number of times of use information represents the number of times of use of the service of each user. In other words, the number of times of use information represents the number of times each user visited the service. The use period information represents a period in which each user used the service. The content quantity information represents the number of contents used by each user. The genre information represents the number of genres of contents used by each user. The number of times of use information, the use period information, the content quantity information, and the genre information are used for calculation of a use maturity to be described below. The first acquisition unit 12 outputs the number of times of use information, the use period information, the content quantity information, and the genre information that have been acquired to the calculation unit 13.

Here, a method of acquiring the number of times of use information, the use period information, the content quantity information, and the genre information (hereinafter, the information may be simply referred to as "each piece of information") will be described using an example illustrated in FIG. 2. In the following description, although a method of acquiring each piece of information for one user will be described, the first acquisition unit 12 acquires each piece of information for each user.

The first acquisition unit 12 acquires the number of times of use information on the basis of the click date and time information included in the server information. More specifically, the first acquisition unit 12 counts the number of dates included in the click date and time information as the number of times of use of the service (the number of times of user's visit to the service through a terminal) on the web or through an application installed in a terminal held by a user and acquires the number of the counted dates as the number of times of use information (the number of times of visit information). In the example illustrated in FIG. 2, the number of times of a user X's use of the service is two times of 4/21 and 4/23. In this case, the first acquisition unit 12 acquires the number of times of use information=2. In addition, as a method of acquiring the number of times of use information, for example, the number of times of use information may be acquired by counting the number of times of a user's use of the service on the basis of the server information regardless of dates included in the click date and time information. In such a case, in the example illustrated in FIG. 2, the number of times of use information=3.

The first acquisition unit 12 acquires use period information on the basis of the click date and time information included in the server information. More specifically, the first acquisition unit 12 counts dates from the oldest date to the latest date included in the click date and time information and acquires the counted dates as the use period information. In the example illustrated in FIG. 2, a period in which the user X had used the service is 4/21 to 4/23 and thus is 3 days. In this case, the first acquisition unit 12 acquires the use period information=3.

The first acquisition unit 12 acquires content quantity information on the basis of content names included in the server information. More specifically, the first acquisition unit 12 counts the number of types of content names included in the server information and acquires the counted number as the content quantity information. In the example illustrated in FIG. 2, the types of content names used by the user X are three types including ppp, qqq, and rrr. In this case, the first acquisition unit 12 acquires the content quantity information=3.

The first acquisition unit 12 acquires genre information (content taste variety) on the basis of genre names included in the server information. More specifically, the first acquisition unit 12 counts the number of types of genre names included in the server information and acquires the counted number as the genre information. In the example illustrated in FIG. 2, the types of genre names of contents used by the user X are two types including an animation and a movie. In this case, the first acquisition unit 12 acquires the genre information=2. As above, the first acquisition unit 12 acquires each piece of information as the user history information and outputs each piece of the information that has been acquired to the calculation unit 13. The user history information may be any information other than that described above, as long as the information can be used for calculation of a use maturity and represents histories relating to use of contents of a plurality of users. In addition, the user history information may be acquired using a method other than that described above. For example, the user history information may be acquired from another system or the like instead of being calculated from server information.

The calculation unit 13 calculates a use maturity representing maturity of use of the service of each user on the basis of the user history information acquired by the first acquisition unit 12. The maturity of use of the service is a degree with which the user is familiar with the service by using the service. As a specific example, the maturity of use of the service represents a degree comprehensively representing a frequency and a time at which the user uses the service and variety of user's use of the service. In other words, the use maturity is acquired not by simply digitalizing a frequency and the like with which the user uses the service but by digitalizing a degree with which the user is familiar with the service through comprehensive determination thereof. In this embodiment, the calculation unit 13 calculates a use maturity of each of a plurality of users on the basis of the number of times of use information, the use period information, the content quantity information, and the genre information.

Hereinafter, a method of calculating a use maturity according to this embodiment will be described. The calculation unit 13 calculates a use maturity of each user by using a Sigmoid function. The Sigmoid function Sigmoid(x) is a function for converting a value such that an output value is 0 to 1 and outputting the converted value and is a function that outputs $1/(1+e^{-ax})$ for an input value x. Here, a (>0) is a parameter set in advance. For example, it is set that a=1 (in other words, a standard Sigmoid function is used). More specifically, the use maturity Mu is represented as Equation (3) as below in which the Sigmoid function is used, and variables input to the Sigmoid function in Equation (3) represented below are represented as Equation (4) and Equation (5) represented below.

$$Mu = 2 \times \text{Sigmoid}(c^T \cdot u) - 1 \quad (3)$$

$$c = (c_1, c_2, \ldots, c_k)^T \quad (4)$$

$$u = (u_1, u_2, \ldots, u_k)^T \quad (5)$$

By calculating the use maturity Mu as above, the use maturity Mu takes a value 0 to 1.

In Equation (3) represented above, u represents a plurality of (k) feature amounts of a user relating to use of the service. $c^T$ represents a plurality of (k) weighting coefficients corresponding to u. In this embodiment, the calculation unit 13 calculates a use maturity using four user feature amounts and four weighting coefficients. In Equation (5) represented above, $u_1$ represents the number of times of a user's use of the service (the number of times of visit), $u_2$ represents a user's use period of the service, $u_3$ represents the number of contents used by the user, and $u_4$ represents the number of genres of contents used by the user (a user's taste variety of contents). In Equation (4) represented above, $c_1$ represents a coefficient corresponding to $u_1$ (the number of times of use), $c_2$ represents a coefficient corresponding to $u_2$ (the use period), $c_3$ represents a coefficient corresponding to $u_3$ (the number of used contents), and $c_4$ represents a coefficient corresponding to $u_4$ (the number of genres of used contents). $c_1$ to $c_4$ are set to values in advance from which an appropriate use maturity is calculated in accordance with a user's use status of the service. For example, $c_1$ to $c_4$ have positive values. In this case, it is represented that, as the value of the use maturity becomes higher, a degree of being familiar with the service becomes higher.

Here, $u_1$ to $u_4$ respectively corresponds to the number of times of use information, the use period information, the content quantity information, and the genre information acquired by the first acquisition unit 12. More specifically, $u_1$ corresponds to number of times of use information, and $u_2$ corresponds to the use period information. In addition, $u_3$ corresponds to the content quantity information, and $u_4$ corresponds to the genre information. For example, in the example illustrated in FIG. 2, $u_1=2$, $u_2=3$, $u_3=3$, and $u_4=2$. The calculation unit 13 determines $u_1$ to $u_4$ on the basis of the number of times of use information, the use period information, the content quantity information, and the genre information that are user history information input from the first acquisition unit 12 and calculates user's use maturity by inputting Equation (4) and Equation (5) represented above to Equation (3) represented above. For example, the calculation unit 13 calculates a use maturity of each user every time the first acquisition unit 12 inputs each piece of information. The calculation unit 13 outputs the calculated a use maturity and a user name of the user corresponding to the calculated use maturity for each user to the second acquisition unit 14 in association with each other.

The method for calculating a use maturity is not particularly limited. For example, the first acquisition unit 12 may acquire at least one of the number of times of use information, the use period information, the content quantity information, and the genre information. In such a case, the calculation unit 13 may calculate a use maturity on the basis of at least one of the number of times of use information, the use period information, the content quantity information, and the genre information acquired by the first acquisition unit 12 or may calculate a use maturity on the basis of other information. In addition, $u_1$ to $u_4$ may be calculated by the calculation unit 13, for example, on the basis of the server information acquired by the first acquisition unit.

Here, in the recommendation system 10, a target algorithm used for recommending contents to a target user is selected in accordance with the use maturity of the target user. More specifically, in this embodiment, the use maturity of a target user is divided into a plurality of levels of "low", "intermediate", and "high", and a process of selecting a target algorithm is performed in accordance with a level of the use maturity of the target user. In this embodiment, hereinafter, the use maturity will be described as being divided into three levels like a case in which the use maturity of 0 to 0.39 is "low", the use maturity of 0.40 to 0.69 is "intermediate", and the use maturity of 0.70 to 1 is "high". In addition, the method for dividing levels of the use maturity is not particularly limited, and, for example, the levels may be divided using values different from those according to this embodiment. A specific process of selecting a target algorithm will be described below.

The second acquisition unit 14 acquires recommendation history information (second history information) of a plurality of users. The recommendation history information is information relating to a history of recommendations of contents to each user. For example, the second acquisition unit 14 acquires recommendation history information by associating the impression date and time information, the target algorithm information, the user name, and the recommendation success/non-success information acquired from the log server with the use maturity calculated by the calculation unit 13 using the common user name. For example, the second acquisition unit 14 acquires the recommendation history information each time the calculation unit 13 calculates a use maturity. In addition, the second acquisition unit 14 may acquire content history information from the storage unit 11 in place of the log server. The second acquisition unit 14 acquires recommendation history information of at least a target user and a user group (details thereof will be described below) among a plurality of users using the service.

FIG. 3 is a diagram illustrating an example of recommendation history information acquired by the second acquisition unit 14. As illustrated in FIG. 3, the recommendation history information includes an impression date and time, target algorithm information, a user name, a use maturity, and recommendation success/non-success information.

The target algorithm information represents a target algorithm used when contents are recommended to each user. The use maturity is a use maturity input from the calculation unit 13. The recommendation success/non-success information is information representing whether or not a content recommended using a target algorithm is used by each user. More specifically, for example, in a state in which a plurality of recommended contents are displayed in a terminal of a user, in a case in which one content or any of a plurality of contents recommended using algorithm A is clicked, it is determined that the recommendation is "successful". On the other hand, in a state in which a plurality of recommended contents are displayed in a terminal of a user, in a case in which one content or any of a plurality of contents recommended using algorithm A has not been clicked (for example, in a case in which the user has moved to a page other than a page on which the contents described above are displayed), it is determined that the recommendation is "unsuccessful".

In the recommendation history information illustrated in FIG. 3, a target algorithm "algorithm A", a user name "user X", a use maturity "0.45", and recommendation success/non-success information "success" are associated with an impression date and time "4/21 13:00". In other words, the recommendation information illustrated in FIG. 3 represents that a plurality of (for example, three) contents were recommended using "algorithm A" to "user X" whose use maturity is "0.45" at an impression date and time "4/21 13:00", and "user X" clicked any of the plurality of recommended contents.

In addition, in the recommendation history information illustrated in FIG. 3, a target algorithm "algorithm B", a user name "user X", a use maturity "0.49", and recommendation success/non-success information "success" are associated with an impression date and time "4/21 13:30". On the other hand, a target algorithm "algorithm A", a user name "user X", a use maturity "0.49", and recommendation success/non-success information "non-success" are associated with the same impression date and time "4/21 13:30". This represents that one or a plurality of contents were recommended using "algorithm A" and one or a plurality of contents were recommended using "algorithm B" to "user X" whose use maturity was "0.49" at the impression date and time "4/21 13:30". More specifically, the information described above represents that, for example, in a case in which a total of three contents are recommended to a target user, and one or two contents were recommended using "algorithm A", and one or two contents were recommended using "algorithm B". The information described above represents that "user X" clicked a content recommended using "algorithm B" among a plurality of recommended contents. In addition, the reason for the use maturity of user X being 0.45 at an impression date and time "4/21 13:00" and being 0.49 at an impression date and time "4/21 13:30" is in that the use maturity was updated in accordance with "user X" using a content at "4/21 13:00".

The second acquisition unit 14 outputs the acquired recommendation history information to the selection unit 15. In FIG. 3, although data of user names "user X", "user Y", and "user Z" is illustrated, this is merely one example, and additional data according to the user names "user X", "user Y", and "user Z", data of other user names, and the like may be included. In addition, in the recommendation history information, if information, which is necessary for selection of a target algorithm, to be described below is included, information different from the information described in this embodiment may be included.

The selection unit 15 selects a target algorithm on the basis of the recommendation history information of a target user and the recommendation history information of a user group. The selection unit 15 selects a target algorithm every time a request for a recommendation of contents to a target user is received from the service system. The user group is a plurality of users having a use maturity corresponding to the use maturity of a target user among a plurality of users. The use maturity corresponding to the use maturity of the target user is a use maturity of the same degree as the use maturity of the target user and, in this embodiment, is a use maturity of the same level as the level of the use maturity of the target user among "low", "intermediate", and "high". In other words, in this embodiment, each user having a use maturity corresponding to the use maturity of a target user is a user having a use maturity of the same level as the level of the use maturity of the target user. In addition, basically, although a target user is also included in a user group, in a case in which the target user does not have recommendation history information such as a timing of start of use of the service and the like, the target user is not included in the user group.

When an example illustrated in FIG. 3 in which user X is a target user is used in description, first, the latest use maturity of user X is 0.49, and thus a level of the maturity is "intermediate" (use maturity: 0.4 to 0.69). Thus, the user group is a group of user X, user Y, and user Z having the use maturity of the same level "intermediate" as the level of the use maturity of the target user. The selection unit 15 selects a target algorithm on the basis of recommendation history information of user X, user Y, and user Z who form a user group of the maturity "intermediate".

Here, the method of selecting a target algorithm will be described. The selection unit 15 calculates a target user distribution and a user group distribution for each of algorithms A, B, and C and selects a target algorithm on the basis of the target user distribution and the user group distribution. More specifically, the selection unit 15 further calculates a sum distribution acquired by adding the target user distribution and the user group distribution for each of algorithms A, B, and C and selects a target algorithm on the basis of the sum distributions.

The target user distribution is a probability distribution of scores representing a degree of a target user's use of recommended contents at the time of recommending contents using each of algorithms A, B, and C as a target algorithm and is a beta distribution. The user group distribution is a probability distribution of scores representing a degree of use of recommended contents for each user of the user group at the time of recommending contents using each of algorithms A, B, and C as a target algorithm and is a beta distribution. The selection unit 15 generates an index value according to a sum distribution acquired by adding the target user distribution and the user group distribution for each of algorithms A, B, and C and selects an algorithm having the largest index value as a target algorithm. The selection unit 15 selects target algorithms corresponding to the number of recommended contents in one recommendation. For example, in a case in which the number of contents recommended to a target user in one recommendation is 3, the selection unit 15 performs the process of selecting a target algorithm by acquiring an index value of each of algorithms A, B, and C on the basis of sum distributions three times and selects a target algorithm for each recommended content. The selection unit 15 outputs information representing a target algorithm selected for each recommended content to the recommendation unit 16.

The selection unit 15 calculates a target user distribution for each of algorithms A, B, and C on the basis of the recommendation history information of a target user.

The target user distribution is calculated using Equation (6) as below.

[Math. 3]

$$\theta_i \sim \text{Beta}(1+l_{u,i}, 1+n_{u,i}-l_{u,i}) \qquad (6)$$

In Equation (6) represented below, $n_{u,i}$ represents the number of recommendations of contents to a target user using an algorithm i (that is, a sum value of the number of successful recommendations and the number of unsuccessful recommendations), and $l_{u,i}$ represents the number of times of the target user's clicking a content (in other words, the number of successful recommendations).

The selection unit 15 calculates a user group distribution for each algorithm on the basis of the recommendation history information of the user group.

The user group distribution is calculated using Equation (7) represented below. Information of many users may be included in the recommendation history information of the user group, and thus when a general equation of a beta distribution similar to Equation (6) represented above is applied, there is concern that the user group distribution may converge. Thus, in Equation (7) represented below, in order to prevent convergence of the user group distribution, an average equation of beta distributions is used.

[Math. 4]

$$\theta_i \sim \text{Beta}\left(1 + \frac{\sum_{M_{u'} \simeq M, u' \in U} l_{u',j}}{\sum_{M_{u'} \simeq M, u' \in U} n_{u',j}}, 1 + \frac{\sum_{M_{u'} \simeq M, u' \in U} (n_{u',j} - l_{u',j})}{\sum_{M_{u'} \simeq M, u' \in U} n_{u',j}}\right) \qquad (7)$$

In Equation (7) represented below, u' represents a user belonging to a user group, M represents a level of a use maturity, U represents a user group, $n_{u',i}$ represents the number of recommendations of contents to a user using an algorithm i (that is, a sum value of the number of successful recommendations and the number of unsuccessful recommendations), and $l_{u',i}$ represents the number of times of the user's clicking a content (in other words, the number of successful recommendations).

The sum distribution is calculated using Equation (8) represented below. A left side of Equation (8) represented below is the same as Equation (6) represented above, and a right side of Equation (8) represented below is the same as Equation (7) represented above.

[Math. 5]

$$\theta_i \sim \text{Beta}(1+l_{u,i}, 1+n_{u,i}-l_{u,i}) + \qquad (8)$$

$$\text{Beta}\left(1 + \frac{\sum_{M_{u'} \simeq M, u' \in U} l_{u',j}}{\sum_{M_{u'} \simeq M, u' \in U} n_{u',j}}, 1 + \frac{\sum_{M_{u'} \simeq M, u' \in U} (n_{u',j} - l_{u',j})}{\sum_{M_{u'} \simeq M, u' \in U} n_{u',j}}\right)$$

Here, the method of calculating a target user distribution, a user group distribution, and a sum distribution will be described using an example illustrated in FIG. 3 in which a target user is user X, and a user group is a group of users X, Y, and Z. For user X (the target user), algorithm A is used, contents are recommended twice, and one recommendation is successful. For this reason, the selection unit 15 inputs 2 to $n_{u,i}$ and inputs 1 to $l_{u,i}$ of Equation (6) represented above for user X. In addition, contents were recommended using algorithm B once for user Z, and the recommendation was successful. For this reason, the selection unit 15 inputs 1 to $n_{u,i}$ and 1 to $l_{u,i}$ of Equation (6) represented above for user X. In addition, contents have not been recommended to user X using algorithm C, and thus the selection unit 15 inputs 0 to $n_{u,i}$ and $l_{u,i}$ of Equation (6) represented above for user X.

Contents were recommended to users X, Y, and Z (the user group) three times using algorithm A, and two recommendations among them were successful. For this reason, the selection unit 15 inputs 3 to $n_{u',i}$ and 2 to $l_{u',i}$ of Equation (7) represented above for the user group. In addition, contents were recommended to users X, Y, and Z two times using algorithm B, and one recommendation among them was successful. For this reason, the selection unit 15 inputs 2 to $n_{u',i}$ and 1 to $l_{u',i}$ of Equation (7) represented above for the user group. In addition, contents have not been recommended to users X, Y, and Z using algorithm C, and thus the selection unit 15 inputs 0 to $n_{u',i}$ and $l_{u',i}$ of Equation (7) represented above for the user group.

In this way, by inputting each value, the selection unit 15 calculates a target user distribution (see Equation (6) represented above) of a target user for each of algorithms A, B, and C and a user group distribution (see Equation (7) represented above) of the user group for each of algorithms A, B, and C. Then, the selection unit 15, as illustrated in Equation (8) represented above, calculates a sum distribution by adding the target user distribution and the user group distribution. In FIG. 3, although a case in which a user group has three users X, Y, and Z has been illustrated, in an actual recommendation system 10, a user group may be configured using many users such as several hundreds of users or several thousands of users.

Figure 4:
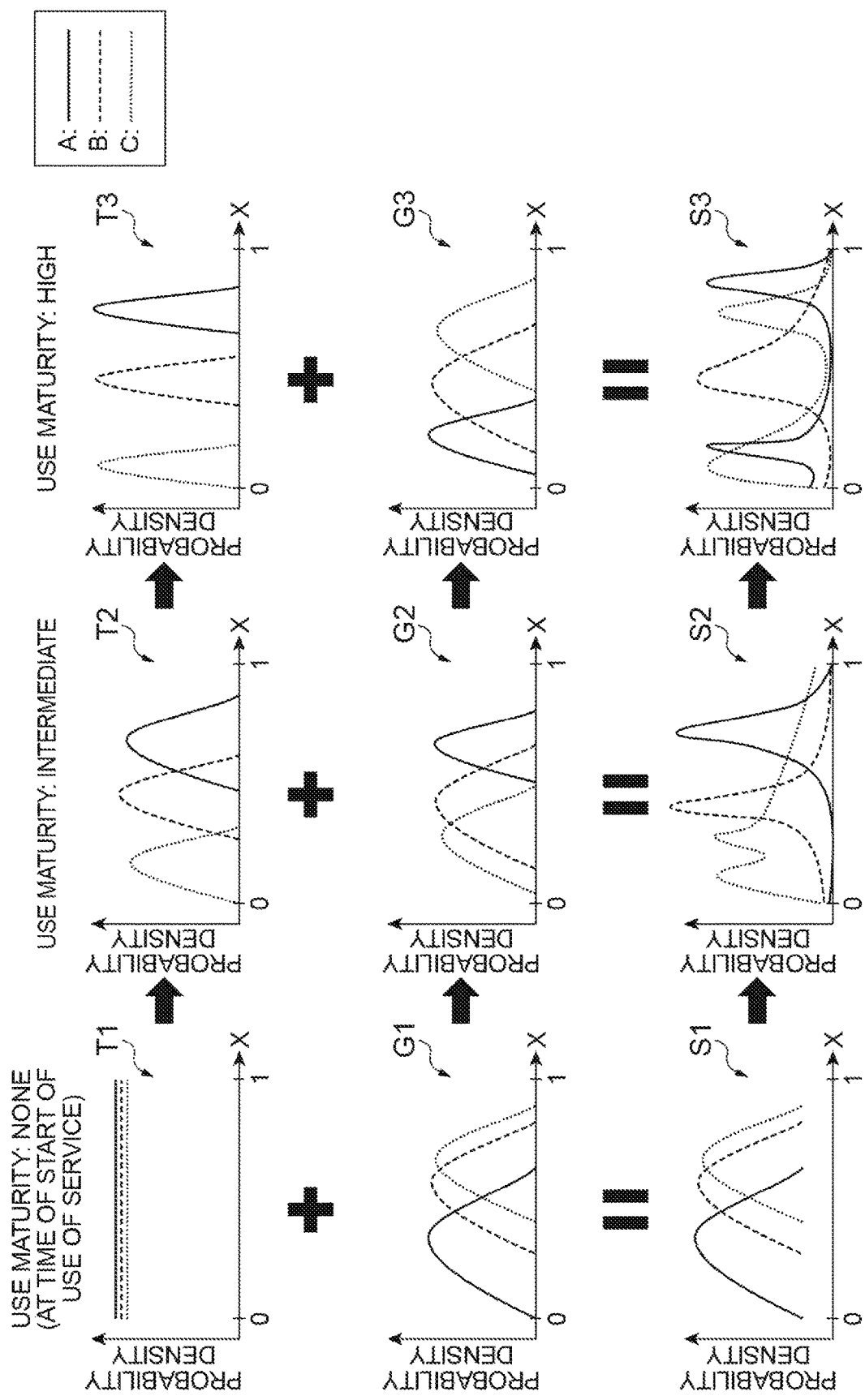
FIG. 4 is a diagram illustrating an example of target user distributions of a target user and each user group, a user group distribution, and a sum distribution.

FIG. 4 is a diagram illustrating an example of target user distributions of a target user and each user group, a user group distribution, and a sum distribution. In FIG. 4, a target user distribution T1 of a target user whose use maturity is "low", a target user distribution T2 of a target user whose use maturity is "intermediate", and a target user distribution T3 of a target user whose use maturity is "high" are illustrated. In addition, in FIG. 4, a user group distribution G1 of a user group whose use maturity is "low", a user group distribution G2 of a user group whose use maturity is "intermediate", and a user group distribution G3 of a user group whose use maturity is "high" are illustrated.

Furthermore, in FIG. 4, a sum distribution S1, a sum distribution S2, and a sum distribution S3 are illustrated. The sum distribution S1 is a beta distribution acquired by adding the target user distribution T1 of the target user whose use maturity is "low" and the user group distribution G1 of the user group for each of algorithms A, B, and C. The sum distribution S2 is a beta distribution acquired by adding the target user distribution T2 of the target user whose use maturity is "intermediate" and the user group distribution G2 of the user group for each of algorithms A, B, and C. The sum distribution S3 is a beta distribution acquired by adding the target user distribution T3 of the target user whose use maturity is "high" and the user group distribution G3 of the user group for each of algorithms A, B, and C.

In the example of the target user distribution T1, the target user is at the timing of start of use of the service and is in a state in which there is no use history of the target user for the service including recommendation history information. Thus, for each of algorithms A, B, and C, the target user distribution T1 becomes a uniform distribution (a prior distribution). In other words, even in a case in which the target user distribution T1 of the target user is used, the selection unit 15 cannot select a target algorithm that is appropriate to the target user. On the other hand, the user group distribution G1 is a distribution for which algorithm C is easily selected the most, and thus it is known that a user group who has started use of the service not long ago, similar to the target user, is in a trend of preferring a recommendation of contents of various genres. In the sum distribution S1, a beta distribution of a user group having a use maturity of the same degree as that of the target user whose use maturity is "low" is reflected, and thus the sum distribution S1 is a distribution for which algorithm C is selected the most easily as a target algorithm by the selection unit 15.

Next, the target user distribution T2 and the user group distribution G2 will be described. A target user whose use maturity is "intermediate" is assumed to start to be familiar with the service, have a specific genre of a taste and frequently use contents of the genre of the taste. Thus, there is a trend for a target user whose use maturity is "intermediate" to prefer algorithm A for recommending contents matching the taste of the target user to algorithm C for recommending contents of various genres. The target user distribution T2 and the user group distribution G2 are distributions for which algorithm A is selected the most easily in accordance with the trend of the target user and the user group whose use maturity is "intermediate". Then, the sum distribution S3 acquired by adding the target user distribution T2 and the user group distribution G2 also becomes a distribution for which algorithm A is selected the most easily.

Next, the target user distribution T3 will be described. When the target user continues to use the service, and the use maturity of the target user becomes higher, the target user is assumed to have viewed contents of the genre of the taste and start to have interest in contents of a new genre. Thus, for a target user whose use maturity is "high", algorithm C is assumed to be appropriate. However, as a result of contents recommended using algorithm A being clicked by a target user with a high probability, in the target user distribution T3, a distribution of each of algorithms A, B, and C converges. Even in a case in which a random number is given on the basis of such a target user distribution T3, an index value of algorithm A becomes the largest all the time, and thus the selection unit 15 selects algorithm A.

On the other hand, by referring to the user group distribution G3, for the user group, the distribution is such that algorithm C can be selected the most easily. The sum distribution S3 acquired by adding the target user distribution T3 and the user group distribution G3 becomes a distribution for which algorithm A and algorithm C can be selected easily. In a case in which an index value is generated on the basis of such a sum distribution S3, there is a high possibility of the index value of algorithm A and the index value of algorithm C being the largest, and thus, for a target user whose use maturity is "high", there is a high possibility of algorithm A or algorithm C being selected by the selection unit 15.

The recommendation unit 16 determines a content to be recommended to the target user by using the selected target algorithm and outputs recommendation content information. More specifically, the recommendation unit 16 acquires information representing a target algorithm input from the selection unit 15 and determines a plurality of contents to be recommended to the target user using the above-described technique using the selected target algorithm. Then, the recommendation unit 16 outputs the recommendation content information to a terminal held by a user through a service system. In this embodiment, the recommendation unit 16 determines a plurality of contents to be recommended to the target user in one recommendation using one of algorithms A, B, and C as a target algorithm. More specifically, the recommendation unit 16 determines a plurality of contents to be recommended using each target algorithm selected by the selection unit 15. In addition, the recommendation unit 16 may directly output the recommendation content information to a terminal held by the user.

FIGS. 5(*a*), 5(*b*), and 6(*a*) are diagrams illustrating examples of recommendation results in which recommendation content information output by the recommendation unit 16 is displayed in a terminal held by a target user through the service system. In the example described below, it is assumed that the recommendation unit 16 determines three contents to be recommended to the target user in one recommendation, and contents are sequentially displayed from the top in the recommendation result.

In FIG. 5(*a*), a recommendation result in a case in which the selection unit 15 selects a target algorithm on the basis of the sum distribution S1 in the example illustrated in FIG. 4 is illustrated. For the sum distribution S1, algorithm C can be selected the most easily. In this case, as a result of performing the process of selecting a target algorithm on the basis of the sum distribution S1 three times, the selection unit 15 is assumed to select algorithm C as the target algorithm. An example of a result of determination of three contents using algorithm C (the target algorithm) acquired by the recommendation unit 16 is the recommendation result illustrated in FIG. 5(*a*). The recommendation result illustrates that contents of various genres are recommended on the basis of algorithm C for recommending contents of various genres. In other words, in a case in which the target user has started the service not long ago (use maturity: low), the recommendation system 10 recommends contents having a high variety.

In FIG. 5(*b*), a recommendation result in a case in which the selection unit 15 selects a target algorithm on the basis of the sum distribution S2 in the example illustrated in FIG. 4 is illustrated. For the sum distribution S2, algorithm A can be selected the most easily. In this case, as a result of performing the process of selecting a target algorithm on the basis of the sum distribution S2 three times, the selection unit 15 is assumed to select algorithm A as the target algorithm. An example of a result of determination of three contents using algorithm A (the target algorithm) acquired by the recommendation unit 16 is the recommendation result illustrated in FIG. 5(*b*). The recommendation result illustrates that contents of a genre (mystery) preferred by the target user are recommended on the basis of algorithm A for recommending contents on the basis of the use history of the target user. In other words, when the user becomes familiar with the service (use maturity: intermediate), the recommendation system 10 makes a recommendation according to a specific genre of contents.

In FIG. 6(*a*), a recommendation result in a case in which the selection unit 15 selects a target algorithm on the basis of the sum distribution S3 in the example illustrated in FIG. 4 is illustrated. For the sum distribution S3, algorithm A and algorithm C are easily selected. In this case, the selection unit 15 is assumed to perform the process of selecting the target algorithm on the basis of the sum distribution S3 three times and, in a recommendation result, select algorithm A as a target algorithm used for determining a content to be displayed first and select algorithm C as a target algorithm used for determining contents to be displayed second and third. An example of a result of determination of three contents using algorithms A and C (the target algorithms) acquired by the recommendation unit 16 is the recommendation result illustrated in FIG. 6(*a*). The recommendation result illustrates that a content of a genre (mystery) preferred by the target user is recommended first on the basis of algorithm A for recommending contents on the basis of the use history of a target user, and contents of various genres are recommended second and third on the basis of algorithm C for recommending contents of various genres. In other words, when the user's use of the service further advances, and the user is tired of the content (use maturity: high), the recommendation system 10 makes a recommendation of a content having a high variety again.

A display form of the recommendation result displayed in the terminal held by the target user is not particularly limited to the example described above. The function of the recommendation system 10 according to this embodiment has been described as above.

Figure 7:
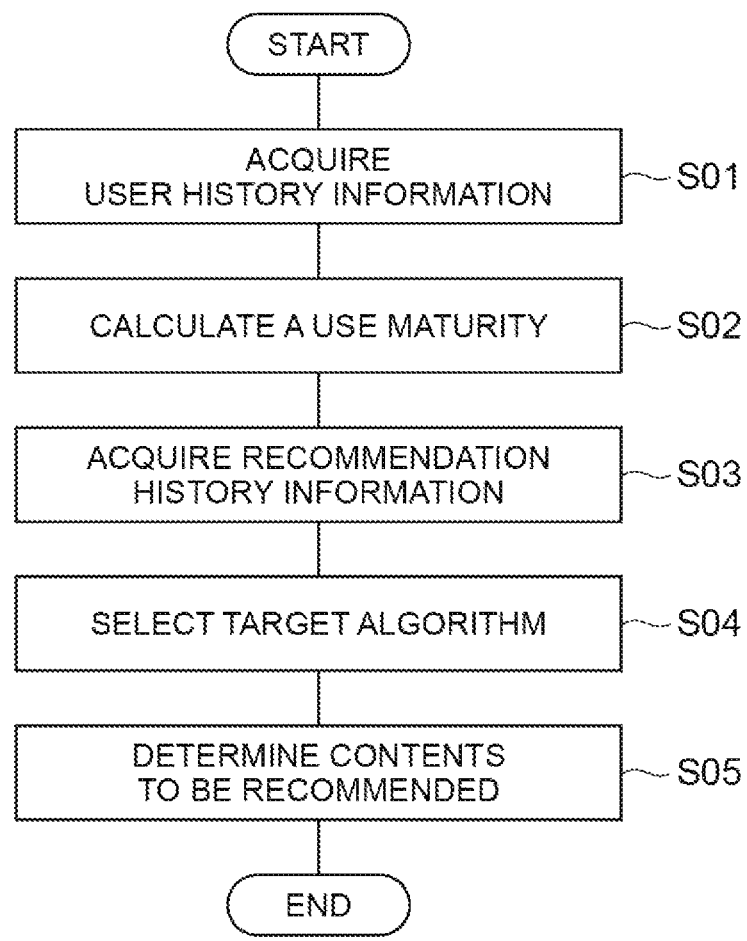
FIG. 7 is a flowchart illustrating an entire process performed by a recommendation system according to this embodiment.

Subsequently, the process performed by the recommendation system 10 according to this embodiment (a recommendation method performed by the recommendation system 10) will be described using a flowchart illustrated in FIG. 7. As illustrated in FIG. 7, in this process, first, user history information is acquired by the first acquisition unit 12 (S01). Next, a use maturity of each user is calculated by the calculation unit 13 on the basis of the user history information (S02). Next, recommendation history information is acquired by the second acquisition unit 14 (S03).

Next, a target algorithm is selected by the selection unit 15 on the basis of the recommendation history information of the target user and the recommendation history information of the user group (S04). Next, by using the selected target algorithm using the recommendation unit 16, contents to be recommended to the target user are determined, and recommendation content information is output (S05). The recommendation process is completed as above.

Next, operation and effects of the recommendation system 10 according to this embodiment will be described.

In this embodiment, by selecting a target algorithm on the basis of recommendation history information of a user group having a use maturity corresponding to the use maturity of a target user and using the selected target algorithm, contents to be recommended to the target user are determined, and information representing the determined contents is output. Thus, according to this embodiment, an appropriate target algorithm is selected in accordance with a use maturity of the target user, and as a result, contents can be appropriately recommended to the user.

More specifically, for example, in a case in which a target algorithm is selected on the basis of recommendation history information of a target user, when the trend in user's selection of contents is biased, there is concern that the same algorithm may be selected in each recommendation (a selected algorithm is fixed). In contrast to this, in this embodiment, a target algorithm is selected on the basis of recommendation history information of a user group, and thus fixation of recommended contents can be prevented. Thus, according to this embodiment, there is a possibility that a recommendation matching a target user's request is made. Furthermore, in this embodiment, selection of an algorithm is performed on the basis of a user group distribution of a user group having a use maturity of the same degree as the use maturity of the target user (in other words, a user group who is familiar with the service with the same degree as the target user). Thus, according to this embodiment, contents corresponding to a recommendation request of a target user changing in accordance with a use maturity can be recommended.

The selection unit 15 calculates a target user distribution that is a probability distribution of scores representing a degree of a target user's use of recommended contents when contents are recommended using each of a plurality of algorithm as a target algorithm on the basis of recommendation history information of the target user, calculates a user group distribution that is a probability distribution of scores representing a degree of use of recommended contents in each of a user group when contents are recommended using each of a plurality of algorithm as a target algorithm on the basis of recommendation history information of the user group, and selects a target algorithm on the basis of the target user distribution and the user group distribution. According to this configuration, a target algorithm that is appropriate for a use maturity of the target user can be reliably selected.

The selection unit 15 additionally calculates a sum distribution acquired by adding the target user distribution and the user group distribution and selects a target algorithm on the basis of the sum distribution. According to this configuration, a target algorithm can be selected by reliably reflecting a trend in the target user's selection of contents and a trend in the user group having a use result of the same degree as the use result of the target user selecting contents.

Here, effects of this embodiment will be described using a comparative example of the recommendation result illustrated in FIG. 6(*b*). FIG. 6(*b*) is an example of a recommendation result in a case in which a target algorithm is selected on the basis of the target user distribution T3 illustrated in FIG. 4. As described above, a target user whose use maturity is "high" is assumed to start to have interest in contents of a new genre, and algorithm C is assumed to be appropriate for such a target user. However, as a result of contents recommended using algorithm A being clicked with a high probability by a target user, for the target user distribution T3, a distribution of each of algorithms A, B, and C converges. Even in a case in which a random number is given on the basis of such a target user distribution T3, the index value of algorithm A is the largest all the time, and thus the selection unit 15 selects algorithm A. Although algorithm C is appropriate for the target user, as illustrated in FIG. 6(*b*), all the recommendation results are acquired by using algorithm A.

In contrast to this, in this embodiment, the selection unit 15 selects a target algorithm on the basis of the sum distribution S3 acquired by adding the target user distribution T3 and the user group distribution G3. For this reason, as illustrated in FIG. 6(*a*), recommendation results are acquired by using algorithm A and algorithm C. Thus, in this embodiment, a target algorithm corresponding to a target user's request changing in accordance with a use maturity can be selected, and contents which the user is not tired of can be recommended.

The recommendation unit 16 determines a plurality of contents to be recommended to a target user in one recommendation, and the selection unit 15 selects a target algorithm for each content to be recommended to the target user. According to this configuration, target algorithms corresponding to the number of contents are selected on the basis of the probability distribution, and thus contents that are appropriate to the target user can be recommended.

The first acquisition unit 12 acquires genre information representing the number of genres of contents used by each of a plurality of users as user history information, and the calculation unit 13 calculates a use maturity of each of the plurality of user on the basis of the genre information.

Generally, the number of genres of contents used by a user is assumed to represent a variety of the user's taste. In addition, a variety of the taste is assumed to have a correlation with a user's use maturity of the service. More specifically, for example, a user having a high variety of the taste is assumed to have a high use maturity of the service. In this embodiment, a use maturity is calculated on the basis of the number of genres of contents selected by the user, and thus the use maturity of each user can be calculated with high accuracy.

The first acquisition unit 12 acquires the number of times of use information representing the number of times of use of the service of each of a plurality of users, use period information representing a period in which each of the plurality of users uses the service, and content quantity information representing the number of contents used by each of the plurality of user as user history information, and the calculation unit 13 calculates the use maturity of each of the plurality of users on the basis of the number of times of use information, the use period information, and the content quantity information. According to this configuration, the use maturity of each user can be calculated with higher accuracy.

In addition, the selection unit 15 may select a target algorithm on the basis of recommendation history information of a user group having a use maturity corresponding to the use maturity of the target user. More specifically, the selection unit 15 may calculate a user group distribution for each of a plurality of algorithms on the basis of the recommendation history information of the user group and select a target algorithm on the basis of only the user group distribution. Also according to this configuration, an appropriate target algorithm is selected in accordance with the use maturity of the target user, and as a result, contents can be appropriately recommended to the user.

Conventionally, in many ECs, a recommendation system recommending contents to a user is employed, and a dedicated algorithm is used in accordance with the purpose. While a bandit algorithm used for distribution (selection) of algorithms is widely used for deriving an optimal solution in a content level, there is no case in which the bandit algorithm is used for deriving an optimal solution in an algorithm level. In such a recommendation system, although there are cases in which a different algorithm is used for each purpose of a recommendation, a technology for changing (selecting) an algorithm that is appropriate for each user (for example, in accordance with a use maturity of the user) has not been present. Particularly, for example, in a moving image distribution service, although a user's recommendation request is assumed to change in accordance with the use maturity of the user, an algorithm corresponding to such a request has not been proposed. In addition, by using a single algorithm, user's changing request cannot be handled.

The inventors of the present invention have invented a system that automatically selects an optimal algorithm from among a plurality of algorithms in accordance with user's use maturity of the service. In accordance with this, a recommendation request changing in accordance with the use maturity of the user can be handled, and a recommendation which the user is not tired of can be presented. In other words, the recommendation system 10 is a recommendation system that grows together with a user.

Each block diagram used for description of the embodiment described above illustrates blocks in units of functions. Such functional blocks (component units) are realized by an arbitrary combination of hardware and/or software. In addition, a method for realizing each functional block is not particularly limited. In other words, each functional block may be realized by using one device that is combined physically and/or logically or using a plurality of devices by directly and/or indirectly (for example, using a wire and/or wirelessly) connecting two or more devices separated physically and/or logically.

Figure 8:
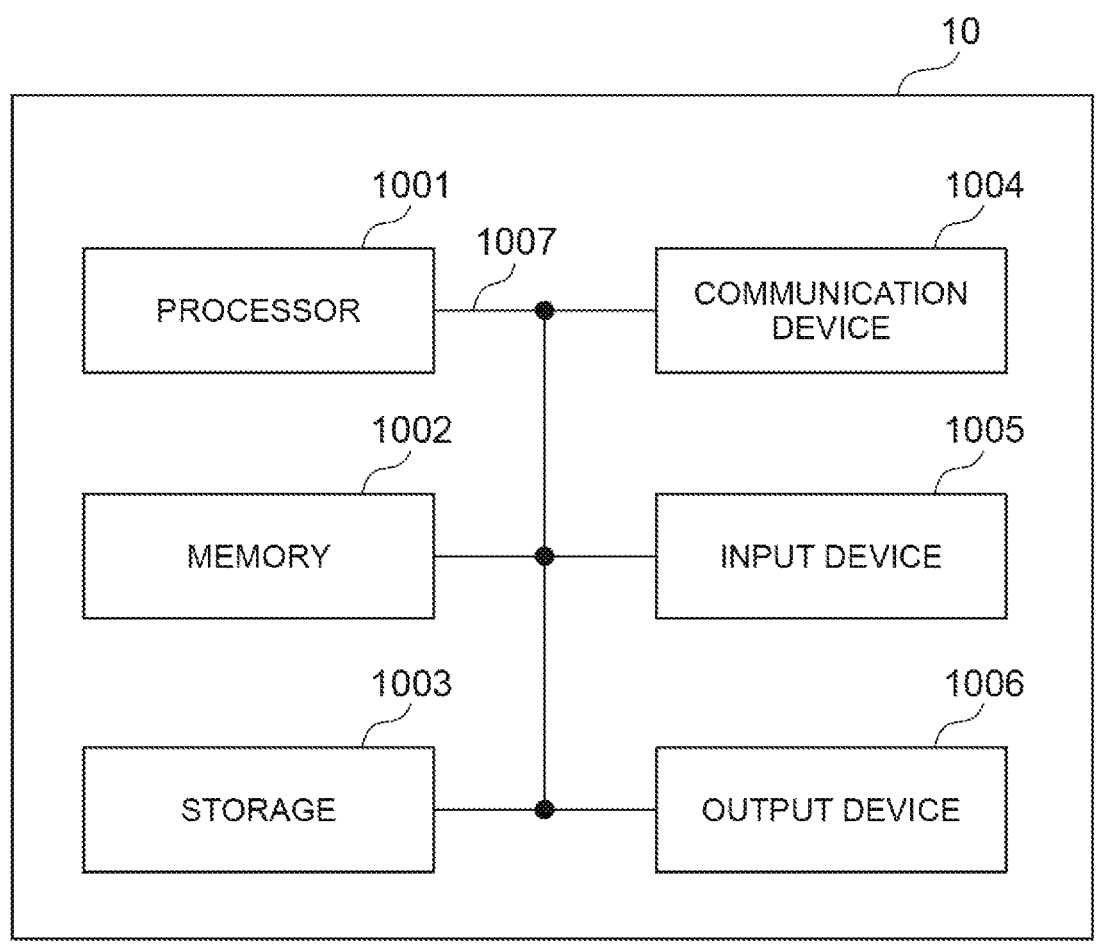
FIG. 8 is a diagram illustrating a hardware configuration of a recommendation system according to this embodiment.

For example, the recommendation system 10 according to an embodiment of the present invention may function as a computer that performs the process of the recommendation system 10 according to this embodiment. FIG. 8 is a diagram illustrating an example of a hardware configuration of the recommendation system 10 according to this embodiment. The recommendation system 10 described above, physically, may be configured as a computer device including a processor 1001, a memory 1002, a storage 1003, a communication device 1004, an input device 1005, an output device 1006, a bus 1007, and the like.

In addition, in the following description, a term "device" may be rephrased as a circuit, a device, a unit, or the like. The hardware configuration of the recommendation system 10 may be configured to include one or a plurality of devices illustrated in the drawing and may be configured without including some of these devices.

Each function of the recommendation system 10 is realized when the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, each function of the recommendation system 10 may be realized by the processor 1001.

In addition, the processor 1001 reads a program (program code), a software module, data, and the like from the storage 1003 and/or the communication device 1004 into the memory 1002 and executes various processes in accordance with these. As the program, a program causing a computer to execute at least some of the operations described in the embodiment described above is used. For example, each function of the recommendation system 10 may be realized by a control program that is stored in the memory 1002 and operated by the processor 1001. Although the various processes described above have been described as being executed by one processor 1001, the processes may be executed simultaneously or sequentially by two or more processors 1001. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing the method according to one embodiment of the present invention.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including the memory 1002 and/or a storage 1003, a server, or any other appropriate medium.

The communication device 1004 is hardware (a transmission/reception device) for performing inter-computer communication through a wired network and/or a wireless network and, for example, may be called also a network device, a network controller, a network card, a communication module, or the like. For example, each function of the recommendation system 10 may be realized by the communication device 1004.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the recommendation system 10 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components. For example, the processor 1001 may be mounted as at least one piece of such hardware.

As above, while this embodiment has been described in detail, it is apparent to a person skilled in the art that this embodiment is not limited to the embodiments described in this specification. This embodiment may be modified or changed without departing from the concept and the scope of the present invention set in accordance with the claims. Thus, the description presented in this specification is for the purpose of exemplary description and does not have any limited meaning for this embodiment.

Notification of information is not limited to an aspect/embodiment described in this specification and may be performed using a difference method. For example, the notification of information may be performed using physical layer signaling (for example, downlink control information (DCI), uplink control information (UCI), upper layer signaling (for example, radio resource control (RRC) signaling, medium access control (MAC) signaling, a master information block (MIB), a system information block (SIB))), any other signal, or a combination thereof. In addition, the RRC signaling may be referred to as a RRC message and, for example, may be an RRC connection setup message, an RRC connection reconfiguration message, or the like.

The processing sequence, the sequence, the flowchart, and the like of each aspect/embodiment described in this specification may be changed in order as long as there is no contradiction. For example, in a method described in this specification, elements of various steps are presented in an exemplary order, and the method is not limited to the presented specific order.

The input/output information and the like may be stored in a specific place (for example, a memory) or managed using a management table. The input/output information and the like may be overwritten, updated, or added to. The output information and the like may be deleted. The input information and the like may be transmitted to another device.

A determination may be performed using a value ("0" or "1") represented by one bit, may be performed using a Boolean value (true or false), or may be performed using a comparison between numerical values (for example, a comparison with a predetermined value).

The aspects/embodiments described in this specification may be individually used, used in combination, or be switched therebetween in accordance with execution. In addition, a notification of predetermined information (for example, a notification of being X) is not limited to be performed explicitly and may be performed implicitly (for example, a notification of the predetermined information is not performed).

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, and the like may be transmitted and received via a transmission medium. For example, in a case in which software is transmitted from a website, a server, or any other remote source using wiring technologies such as a coaxial cable, an optical fiber cable, a twisted pair, a digital subscriber line (DSL) and the like and/or radio technologies such infrared rays, radio waves, and microwaves, and the like, such wiring technologies and/or radio technologies are included in the definition of the transmission medium.

Information, a signal, and the like described in this specification may be represented using any one among various different technologies. For example, data, an instruction, a command, information, a signal, a bit, a symbol, a chip, and the like described over the entire description presented above may be represented using a voltage, a current, radiowaves, a magnetic field or magnetic particles, an optical field or photons, or an arbitrary combination thereof.

In addition, a term described in this specification and/or a term that is necessary for understanding this specification may be substituted with terms having the same meaning or a meaning similar thereto. For example, a channel and/or symbol may be a signal. In addition, a signal may be a message. Furthermore, a component carrier (CC) may be referred also as a carrier frequency, a cell, or the like.

Terms "system" and "network" used in this specification are interchangeable used.

In addition, information, a parameter, and the like described in this specification may be represented using absolute values, relative values from predetermined values, or other corresponding information. For example, radio resources may be represented using indices.

A name used for each parameter described above is not limited in any aspect. In addition, numerical equations using such parameters may be different from those that are explicitly disclosed in this specification. Various channels (for example, a PUCCH, a PDCCH, and the like) and information elements (for example, a TPC and the like) can be identified using all the appropriate names, and various names assigned to such various channels and information elements are not limited in any aspect.

Terms such as "determining" used in this specification may include various operations of various types. The "determining", for example, may include a case in which judging, calculating, computing, processing, deriving, investigating, looking up (for example, looking up a table, a database, or any other data structure), or ascertaining is regarded as "determining". In addition, "determining" may include a case in which receiving (for example, receiving information), transmitting (for example, transmitting information), input, output, or accessing (for example, accessing data in a memory) is regarded as "determining". Furthermore, "determining" may include a case in which resolving, selecting, choosing, establishing, comparing, or the like is regarded as "determining". In other words, "determining" includes a case in which a certain operation is regarded as "determining".

Terms such as "connected" or "coupled" or all the modifications thereof mean all the kinds of direct or indirect connection or coupling between two or more elements and may include presence of one or more intermediate elements between two elements that are mutually "connected" or "coupled". Coupling or connection between elements may be physical coupling or connection, logical coupling or connection, or a combination thereof. When used in this specification, two elements may be considered as being mutually "connected" or "coupled" by using one or more wires, cables and/or print electric connections and, as several non-limiting and non-comprehensive examples, by using electromagnetic energy such as electromagnetic energy having wavelengths in a radio frequency region, a microwave region, and a light (both visible light and non-visible light) region.

Description of "on the basis of" used in this specification does not mean "only on the basis of" unless otherwise mentioned. In other words, description of "on the basis of" means both "only on the basis of" and "at least on the basis of".

In this specification, in a case in which names such as "first", "second", and the like is used, referring to each element does not generally limit the amount or the order of such an element. Such names may be used in this specification as a convenient way for distinguishing two or more elements from each other. Accordingly, referring to the first and second elements does not mean that only the two elements are employed therein, or the first element needs to precede the second element in a certain form.

As long as "include", "including", and modifications thereof are used in this specification or the claims, such terms are intended to be inclusive like a term "comprising". In addition, a term "or" used in this specification or the claims is intended to be not an exclusive logical sum.

In this specification, other than a case in which clearly only one device is present in a context or technically, a device includes a plurality of devices. In the entirety of the present disclosure, unless a singularity is represented clearly from the context, it includes a plurality thereof.

REFERENCE SIGNS LIST

10 Recommendation system
12 First acquisition unit
13 Calculation unit
14 Second acquisition unit
15 Selection unit
16 Recommendation unit
A, B, C Algorithm (target algorithm)
G1, G2, G3 User group distribution
S1, S2, S3 Added distribution
T1, T2, T3 Target user distribution
X User (target user)
X, Y, Z User (user group)

The invention claimed is:

1. A recommendation system configured to determine a content to be recommended to a target user in a service providing contents to a plurality of users including the target user using a target algorithm that is one algorithm selected among a plurality of algorithms each configured to determine a content to be recommended to the target user and having mutually-different features as trends in determination of contents, the recommendation system comprising circuitry configured to:
   automatically acquire, via a communication network, first history information that is information representing histories relating to use of contents of the plurality of users;
   calculate a use maturity representing maturity of use of the service for each of the plurality of users on the basis of the first history information;
   acquire second history information including target algorithm information representing the target algorithm used when contents are recommended to each of the plurality of users and recommendation success/non-success information that is information representing whether or not the contents recommended using the target algorithm has been used by each of the plurality of users;
   select the target algorithm on the basis of the second history information of a user group having a use maturity corresponding to the use maturity of the target user among the plurality of users; and
   automatically determine a content to be recommended to the target user using the selected target algorithm and output, via the communication network, information representing the determined content to be recommended to the target user,
   wherein the circuitry acquires at least one of the number of times of use information representing the number of times of use of the service of each of a plurality of users, use period information representing a period in which each of the plurality of users used the service, and content quantity information representing the number of contents used by each of the plurality of users as the first history information, and
   wherein the circuitry calculates the use maturity of each of the plurality of users on the basis of at least one of the number of times of use information, the use period information, and the content quantity information.

2. The recommendation system according to claim 1, wherein the circuitry calculates a user group distribution that is a probability distribution of scores representing a degree of use of the recommended contents in each user of the user group when contents are recommended using as the target algorithm for each of the plurality of algorithms on the basis of the second history information of the user group and selects the target algorithm on the basis of the user group distribution.

3. The recommendation system according to claim 2, wherein the circuitry additionally calculates a target user distribution that is a probability distribution of scores representing a degree of use of recommended contents in the target user when contents are recommended using as the target algorithm for each of the plurality of algorithms on the basis of the second history information of the target user and selects the target algorithm on the basis of the target user distribution and the user group distribution.

4. The recommendation system according to claim 3, wherein the circuitry additionally calculates a sum distribution acquired by adding the target user distribution and the user group distribution and selects the target algorithm on the basis of the sum distribution.

5. The recommendation system according to claim 1, wherein the circuitry determines a plurality of contents to be recommended to the target user in one recommendation, and
   selects the target algorithm for each content recommended to the target user.

6. The recommendation system according to claim 1, wherein the circuitry acquires genre information representing the number of genres of contents used by each of the plurality of users as the first history information, and
   calculates the use maturity of each of the plurality of users on the basis of the genre information.

7. The recommendation system according to claim 2, wherein the circuitry determines a plurality of contents to be recommended to the target user in one recommendation, and
   selects the target algorithm for each content recommended to the target user.

8. The recommendation system according to claim 3, wherein the circuitry determines a plurality of contents to be recommended to the target user in one recommendation, and
   selects the target algorithm for each content recommended to the target user.

9. The recommendation system according to claim 4, wherein the circuitry determines a plurality of contents to be recommended to the target user in one recommendation, and
   selects the target algorithm for each content recommended to the target user.

10. A method, implemented by circuitry of a recommendation system configured to determine a content to be recommended to a target user in a service providing contents to a plurality of users including the target user using a target algorithm that is one algorithm selected among a plurality of algorithms each configured to determine a content to be recommended to the target user and having mutually-different features as trends in determination of contents, the method comprising:
    automatically acquiring, via a communication network, first history information that is information representing histories relating to use of contents of the plurality of users;
    calculating a use maturity representing maturity of use of the service for each of the plurality of users on the basis of the first history information;
    acquiring second history information including target algorithm information representing the target algorithm used when contents are recommended to each of the plurality of users and recommendation success/non-success information that is information representing whether or not the contents recommended using the target algorithm has been used by each of the plurality of users;
    selecting the target algorithm on the basis of the second history information of a user group having a use maturity corresponding to the use maturity of the target user among the plurality of users; and
    automatically determining a content to be recommended to the target user using the selected target algorithm and output, via the communication network, information representing the determined content to be recommended to the target user, wherein the method further includes
- acquiring at least one of the number of times of use information representing the number of times of use of the service of each of a plurality of users, use period information representing a period in which each of the plurality of users used the service, and content quantity information representing the number of contents used by each of the plurality of users as the first history information, and
- calculating the use maturity of each of the plurality of users on the basis of at least one of the number of times of use information, the use period information, and the content quantity information.

* * * * *